Aug. 25, 1970  G. J. HAHN  3,525,788

ROTOCASTING OF POLYSTYRENE

Filed May 24, 1967  2 Sheets-Sheet 1

INVENTOR
GRANVILLE J. HAHN

BY
Sol B. Wiczer
ATTORNEY

Aug. 25, 1970 G. J. HAHN 3,525,788
ROTOCASTING OF POLYSTYRENE
Filed May 24, 1967 2 Sheets-Sheet 2

INVENTOR
GRANVILLE J. HAHN
BY
Sol B. Wiegs
ATTORNEY

United States Patent Office 3,525,788
Patented Aug. 25, 1970

3,525,788
ROTOCASTING OF POLYSTYRENE
Granville J. Hahn, Big Spring, Tex., assignor to Cosden Oil & Chemical Company, Big Spring, Tex., a corporation of Delaware
Filed May 24, 1967, Ser. No. 640,936
Int. Cl. B29c 5/04; B29b 1/00
U.S. Cl. 264—310                                    4 Claims

ABSTRACT OF THE DISCLOSURE

Polystyrene beads are converted to a form useful for rotocasting by press-flattening to a non-spheroidal shape by passing through rollers which coalesces some of the beads into larger particles while reducing large beads into a flattened shape in one dimension, whereby the product used in rotocasting evenly coats the inside of the mold, particularly in the wall projections, and large flat surface areas which were normally too thin to allow polystyrene beads to be molded by rotocasting.

---

This invention relates to the treatment of polystyrene beads to improve their suitability for use for molding into hollow articles by rotocasting procedures. More particularly, this invention is directed to a process for modifying the shape of the polystyrene beads by pressure to non-spheroidal flattened form, whereby to convert the beads to a flattened product readily moldable into hollow bodies by rotocasting.

Moldable thermoplastic products are generally available as pellets, powders, or catalytically settable liquids, and in these forms are directly useful for molding of solid bodies by filling a mold, or by hot extrusion through a die. However, for molding of hollow bodies, such as by rotocasting, sometimes known as rotational molding, in which the thermoplastic product is placed in a partially filled mold, and heated with simultaneous rotation in different planes, only powders or liquid polymyers have been successfully molded. When the polystyrene beads, formed in suspension polymerization procedures, are attempted to be molded into similar hollow bodies by rotocasting, the beads only partially filling the mold do not evenly distribute themselves in the rotating mold and apparently do not satisfactorily evenly coat sharp corner portions and large surface areas of the mold interior, forming some portions which are too thick and others that are too thin, so that the molded product is either imperfect to have alternate incomplete flat and large blob deposited areas or mechanically weak corner or depression parts when formed from polystyrene beads. Generally when polystyrene beads are to be molded, as a consequence, they were first extruded into pellets which can be filled into closed molds, or extruded to desirably shaped solid molded products; and, for rotocasting, these pre-molded products were ground to fine powders.

For present purposes of rotocasting, beads, too, could be finely ground to a powder, but only with difficulty. Some beads normally selected of a very small particle size, less than about 100 mesh, can be used, but it is not practical to produce beads by suspension procedures this small for rotocasting. Moreover, while fine suspension polymerized beads can be classified by sifting to separate such very fine beads for rotocasting, these finer bead products produce only fair rotocast moldings. It is also possible to improve rotational casting of commonly larger sized 10 to 100 mesh polystyrene beads by providing a critical content of a modifying component to improve the impact strength, such as supplying 1 to 20% of rubber to the suspension-polymerized polystyrene to form the bead, but only in critically exact narrow rubber contents are such larger beads useful for forming rotocastings, the best bead impact rotocast product being quite inferior to rotocastings of flattened beads of the present invention.

According to the present invention beads less than about 10 mesh, such as in a conventional range of 10 to 100 mesh, as usually produced by suspension polymerization, are improved for rotocasting by flattening the bead to a non-spheroidal shape by passing the beads through rollers having rigid surfaces, such as steel rollers, with the nip therebetween adjusted to less than about 10 mesh, whereby the larger beads are flattened as they pass through the rollers and some of the smaller beads are also coalesced by the pressure into larger flat particles. Thus, as the beads are fed, usually at ambient temperature, through the nip of the tangential rollers having a rigid hard surface at the adjusted clearance, the entire bead product is modified in the thickness dimension so that the larger beads are flattened and the smaller beads are coalesced into a large flat bead, all having the appearance of flat flakes as emitted from the rollers. These flakes can further be slightly size comminuted, but this is not necessary for present purposes, such further comminution serving only to break up the longitudinal dimension of the large flakes to a freer-flowing particle product of smaller flakes, whose largest dimension has opposite flattened surfaces characteristic of flakes of a fixed width as of less than 10 mesh as fixed by the rollers.

For instance, upon passage of beads normally having a particle size relatively evenly distributed in round bead form between about 10 and 100 mesh, through the nip of tangential steel rollers set apart from 0.001 to 0.01 inch, for example, approximately 0.006 inch, loose agglomerates such as flattened flakes are produced in which more than 80% has a mesh size, even after breaking up the larger flakes by grinding lightly, between 60 and 80 mesh. Such product fed to a rotational casting device having a mold even with sharp corners and large surfaces is evenly distributed over the surfaces and perfect rotationally-molded castings are formed. The difference is shown by reference to the drawings in which:

Figure 1:
FIG. 1 is a sectional elevation through a portion of a rotocast panel from commercial polystyrene beads averaging 30 to 100 mesh and showing a large central section which was imperfectly covered by beads.

As shown in the drawings, the corresponding spots marked A refer to weakness points resulting when the commercial polystyrene beads are rotocast indicating the molded product to be completely unsuitable as a commercially cast product. For instance, the large panel body shown in FIGS. 1 and 2 was rotocast from commercial polystyrene as a side panel portion of a hollow table. The large flat central portion of the panel at A is completely open and imperfect by the large hole therein.

Figure 3:
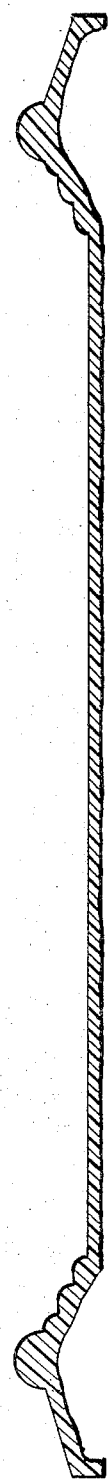
FIG. 3 shows the same elevational section through the same kind of rotocast panel of FIG. 1 but formed by pressure flattened beads of this invention.

In contrast thereto, a second rotocasting was formed in the same die and a panel was cut therefrom. As shown in FIG. 3, the center portion of the panel as well as the entire casting was perfect, all of the walls having an even thickness. Consequently, it is apparent that the same castings formed by the roller flattened bead comprising the polystyrene flakes of the present invention are superior.

Figure 2:
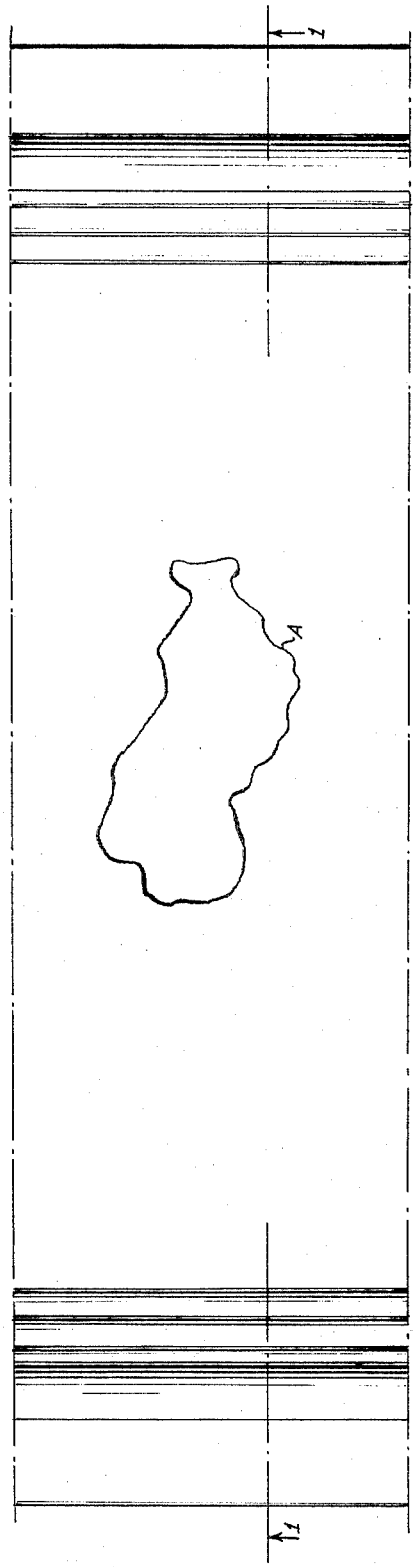
FIG. 2 shows a front elevation of the panel of FIG. 1.
Figures 4, 5:
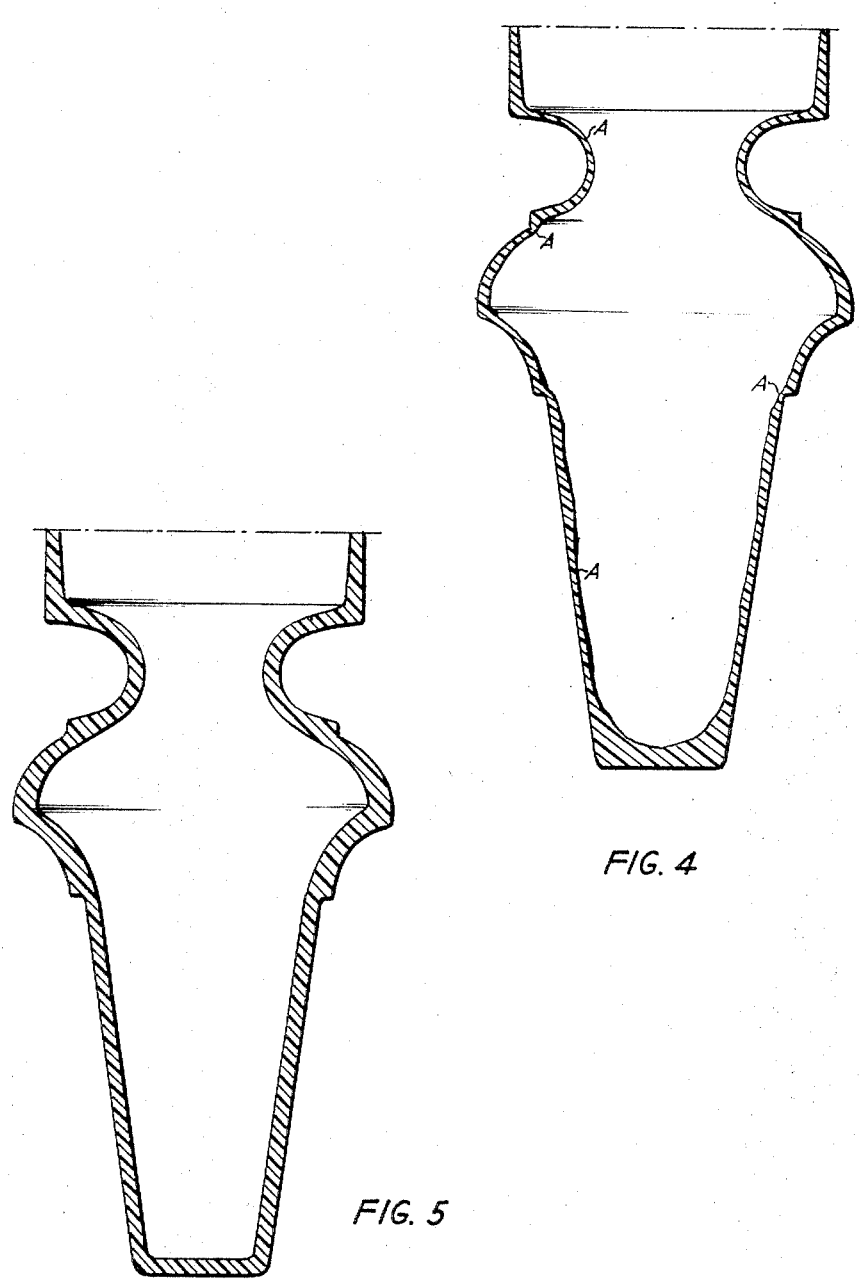
FIG. 4 shows an elevational view of a rotocasting of a pedestal leg formed from the same bead mixture of FIG. 1.
FIG. 5 shows the same elevational section through a pedestal leg formed as in FIG. 4 from the pressure flattened beads of this invention.

Again, as shown in FIG. 4, a rotocasting of a pedestal leg formed from the same commercial beads as the panel casting of FIG. 1, had a weak spot on a thin, curved, depressed section as well as a thin spot in a corner, both marked A on the drawing. In contrast, the same casting formed with flaked polystyrene of Example IC had even walls throughout as shown in FIG. 5.

The following examples illustrate the practice of this invention:

EXAMPLE I

Part A

A 200 pound batch was made by mixing six parts of polybutadiene rubber with 100 parts of styrene monomer. The mixture is stirred until the rubber is dissolved. To the solution is added 0.1 part of dodecyl mercaptan. The solution is then heated with stirring at 230° F. until 35% of the monomer is converted to polymer. In another vessel is prepared a suspension system consisting of 100 parts water, 0.8 parts tricalcium phosphate (1 part $Na_3PO_4$ and 1.4 $CaC_2$), and 0.003 part sodium dodecyl benzene sulfonate. The polymer mixture is added to the suspension system along with 0.1 part tertiary butyl perbenzoate and stirred such that a suspension of fine particles of polymer mixture exists throughout the suspension phase. The stirring is continued with heating at 230° F. to achieve essentially complete conversion of the monomer to polymer. A higher finishing temperature may be employed as necessary.

The finished particles of polymer are cooled, washed thoroughly to remove the suspension system, and dried in a tray dryer. The finished particles are essentially free of moisture and undesired impurities. The particle size is as shown below.

| Retained on (U.S. Standard mesh): | Percent |
| --- | --- |
| 10 | Nil |
| 20 | Nil |
| 30 | 1.6 |
| 40 | 31.6 |
| 60 | 21.6 |
| 80 | 17.7 |
| 100 | 10.0 |
| Minus 100 | 17.5 |
| | 100.0 |

Microscopic examination indicates the particles are essentially spherical or bead-like in shape.

Part B 100 parts of the dried, finished beads prepared as in Part A above are added to an intensive mixer or other device capable of imparting a rapid mixing action to the particles. To this is added 0.1 part of butylated hydroxy toluene (BHT) antioxidant. The antioxidant is spread throughout the polymer by the mixer such that the surface of all the polymer particles is in the immediate vicinity of particles of antioxidant.

The particles of polymer so protected by antioxidant are subjected to crushing by passing them through the nip of a two roll mill. The distance between the rolls is set at approximately 0.006 inch such that most of the particles of polymer must be severely deformed to pass through. The passage imparts a permanent flattening effect to the spherical particles and many of them actually crack into rough fragments since the elastic limit is passed. Many of the particles leaving the rolls are crushed together to form loose agglomerates about ¼ to 1 inch in diameter and about 0.01 inch thick. These agglomerates may be readily broken up by an impact mill or grinding device such that small irregular shapes of polymer result. Some of the particles remain spherical and are relatively unchanged.

The particle size of the particles after being broken is as shown below.

| Retained on (U.S. Standard mesh): | Percent |
| --- | --- |
| 10 | Nil |
| 20 | 2.9 |
| 30 | 3.1 |
| 40 | 9.6 |
| 60 | 70.9 |
| 80 | 11.5 |
| 100 | 1.0 |
| Minus 100 | 1.0 |
| | 100.0 |

Part C

Two pounds of the rough particles as prepared in Part B above are added to a hollow die in the shape of a small furniture pedestal or stand about 7½ inches high and 12½ inches across the hexagon at the base. The die is of cast aluminum and is constructed in two halves, such that a finished part may be removed. The closed die forming the hollow shape with the polymer particles inside is clamped onto the end of an arm of a rotational casting machine. The arm is then moved such that the die turns along two axes, perpendicular one to the other. The rotational speed of approximately 12 r.p.m. causes the polymer to be centrifugally cast to the furthermost parts of the die. Since the shape is formed approximately ⅛ of an inch thick and conforms to the appearance of the die surfaces. To fuse the loose polymer particles, the rotating die with the particles enclosed is moved into a circulating air oven maintained at a temperature of 750° F. After 10 minutes the rotating die is removed and quenched to ambient temperature using an air-water spray. The rotation is stopped and the cooled polymer is removed. It is seen that the particles have fused smoothly together into a homogeneous mass which is hollow and conforms to the interior shape of the die. When the pedestal is sawed in half and examined, the polymer is seen as a relatively smooth mass of about the same thickness throughout the pedestal. Although some extra polymer exists in the corners, no great amount exists as extra thick spots on the flat portions of the pedestal. The minimum thickness anywhere on the part is seen to be 1/16 of an inch, which provides strength and rigidity to the pedestal.

EXAMPLE II 100 parts of dried, finished, bead polymer as prepared in Example IA above are added to an intensive mixer along with 0.1 part of BHT antioxidant. The antioxidant and bead polymer are combined as in Example IB above. The particles of polymer are not subjected to any forces sufficient to substantially deform their spherical shape. 2 pounds of the particles are placed directly in the hollow die, described in Example IC above. The polymer is subjected to the same rotational forces and heated for 10 minutes at 750° F. The die is then removed from the oven and cooled to ambient conditions as in Example IC above. The rotation is stopped and the die is opened so that the pedestal may be removed. When the pedestal is sawed in half and examined, the interior is very rough. The shell of polymer forming the pedestal has spots as thin as 1/16 of an inch and as thick as ⅜ if an inch existing very close together. The polymer does not distribute well, leaving a mixture of very weak and very strong spots. In fact, a few spots were even incompletely covered with polymer and pin holes were present.

EXAMPLE III 80 grams of crushed particles prepared as in Example IB above, are added to a cast aluminum die in the shape of a furniture leg 5½ inches high. The die containing the particles is closed and purged with nitrogen gas to expel the air. The die is fixed onto a rotational casting machine and the arm is rotated at 12.5 r.p.m. on the minor axis and 10 r.p.m. on the major axis. The arm holding the rotating die is moved into a circulating air oven at 800° F. and maintained at that temperature for 8 minutes. The die is then removed and cooled and the polymer is removed. The polymer is seen to be fused in the shape of a hollow furniture leg, averaging approximately 3/32 of an inch thick. The minimum thickness is seen to be 1/16 of an inch.

For an impact test the leg is dropped from a height of 10 feet without breakage.

EXAMPLE IV

Example III is repeated except that spherical bead polymer is used that has not been subjected to crushing (similar to Example II). The resulting furniture leg is found to be similar to that produced in Example III above except that portions of it are as thin as 1/32 of an inch. When the leg is subjected to a 10 foot drop, the necked down portion is completely sheared off, resulting in total failure. Examination shows that the necked down portion is the thinnest wall section. Even though other portions have reasonable distribution, the leg is only as good as this weakest section and is theerfore not useful at all.

EXAMPLE V

Example I is repeated except that 8 parts of polybutadiene are used instead of 6 parts, and 3 parts of an white oil lubricant are added to the polymer mixture just prior to mixing with the suspension system.

The resulting bead polymer appears similar to that resulting from Example I. A portion of the polymer is treated as in Example IB and molded as in Example IC. The resulting pedestal is similar to that produced in Example IC except that when tested for impact strength it is found to be much tougher.

In an abuse test consisting of dropping from a height of five feet, the pedestal remains intact and does not crack. Using a fixed load of 200 pounds on the top of the pedestal, it is seen that the corners are strong and do not fail.

EXAMPLE VI

Part A 100 parts of styrene monomer, 100 parts of water, 0.25 part benzoyl peroxide, 0.5 part tricalcium phosphate, and 0.003 part sodium dodecyl benzene sulfonate are added to a stirred autoclave. The monomer phase forms a suspension of small droplets in water. The mixture is heated to 195° F. and maintained until substantially all of the monomer is converted to polymer. The temperature may then be increased to 250° F. to finish the polymer. The bead polymer slurry is cooled to ambient conditions, acid washed to remove the tricalcium phosphate, centrifuged and dried.

Part B

The dried spherical bead polystyrene homopolymer produced in Example VIA, above, is crushed with a roll mill as in Example IB. The crushed particles are then molded into a pedestal as in Example IC above. The resulting pedestal has good distribution of the polymer such that the wall thickness is relatively even, no spot being less than 1/16 of an inch thick. The pedestal is very rigid but lower in impact as compared to a rubber-modified high impact part.

EXAMPLE VII

Part A 0.1 part of dodecyl mercaptan, 10 parts of polybutadiene rubber, 22 parts of acrylonitrile monomer, and 68 parts of styrene monomer are mixed together and stirred until the rubber is dissolved. The solution is transferred to a stirred autoclave, heated to 195° F., and reacted until 30% of the monomers are converted to polymer. In another vessel a water phase is prepared consisting of 100 parts of water, 1 part of tricalcium phosphate, 0.003 part of sodium dodecyl benzene sulfonate. The partially polymerized mass is added to the water phase along with 0.05 part of tertiary butyl perbenzoate. The suspension thus formed is heated with stirring to 195° F. for 4 hours and 240° F. for 2 hours. The finished polymer slurry consisting of hard beads of acrylonitrile-butadiene-styrene terpolymer is cooled, washed with HCl and water and dried.

Part B

The beads of polymer prepared in Example VIIA above are crushed as in Example IB and molded as in Example IC, except that a slightly longer molding cycle is required. The resulting pedestal is sawed in two and has good polymer distribution in the walls in that no spot is thinner than 1/16 of an inch.

EXAMPLE VIII

Example VII is repeated in its entirety except that the polybutadiene rubber is omitted. The results are similar except that the acrylonitrile-styrene polymer does not possess as high an impact strength as the terpolymer.

Certain modifications will occur to those skilled in the art. The flakes, for example, after forming by press flattening, may be further ground or milled to smaller particle sizes in a U.S. Standard sieve ranging normally from 25 to 125, usually from 50 to 100 mesh.

The polystyrene hereof may be crystal polystyrene or high impact polystyrene, formed with a 1 to 20% rubber content, usually formed by suspending rubber particles in the styrene monomer and completing the suspension to bead form of the rubber-containing monomer. Styrene copolymers with other common polymerizable components such as acrylonitrile as well as ternary copolymers of styrene, acrylonitrile containing rubber dissolved in the monomeric mixture, as set forth in the examples, are also useful.

The product is easily pigmented by abrasively mixing the bead with pigment as described in my copending application, Ser. No. 594,998, filed Nov. 17, 1966, and entitled Polymer Pigmentation, whereby the pigmented flattened bead may then be rotocast to produce beautifully pigmented rotocast products as desired.

Moreover, it is also very easy to color a polystyrene bead by abrasively mixing the bead with a desired pigment when such abrasively colored beads are being flattened by passing through the rigidly surfaced rollers according to the present invention. The pigment by either method remains evenly distributed and strongly adhered to the flakes which form quite homogeneously colored castings with the color evenly distributed throughout.

As shown in the examples, the styrene polymer usually contains anti-oxidant, which in the case of rotocasting, is a particularly desirable component because of the exposure of the styrene at fluidizing temperatures for rotocasting for substantial time periods while the rotocasting is being performed, the anti-oxidant serving to further stabilize the polymer against oxidation under these prolonged oxidizing conditions.

Other modifications will occur to those skilled in the art and, accordingly, it is intended that the description and examples herein be regarded as illustrative and not limiting except as defined in the claims appended hereto.

What is claimed is:

1. The process of rotocasting of non-foamable polystyrene beads having an average particle size in the range of 10 to 100 mesh comprising pressure flattening said beads to flake form to a thickness in the range of about 0.001 to 0.01 inch and rotocasting the polystyrene in said flaked form by slowly rotating said flakes in a heated mold having sharp corner portions and large surface areas.

2. The process as defined in claim 1 wherein said polystyrene beads having an average mesh size in the range of 10 to 100 are first pressure flattened to flake form by passing said beads through the nip of hard surface rollers adjusted to a clearance of 0.001 to 0.01 inch.

3. The process as defined in claim 1 wherein the beads are first abrasively pigmented to desired color and then pressure flattened into flakes before rotocasting.

4. The process as defined in claim 1 wherein the polystyrene beads are selected from the group consisting of crystal polystyrene, copolymer of styrene and acrylonitrile and high impacts thereof containing 1 to 20% of rubber therein.

References Cited

UNITED STATES PATENTS

| | | |
|---|---|---|
| 2,548,909 | 4/1951 | Ryden. |
| 3,030,668 | 4/1962 | Taylor _____ 264—311 |
| 3,056,753 | 10/1962 | Fronko. |
| 3,116,349 | 12/1963 | Immel. |
| 3,178,491 | 4/1965 | Dart. |
| 3,222,343 | 12/1965 | Ingram. |
| 3,291,762 | 12/1966 | Raymond. |
| 3,309,439 | 3/1967 | Nonweiler _____ 264—311 |
| 3,368,009 | 2/1968 | Oddi _____ 264—117 |

FOREIGN PATENTS 225,793   12/1959   Australia.

ROBERT F. WHITE, Primary Examiner

ALLEN M. SOKAL, Assistant Examiner